(12) United States Patent
Saito et al.

(10) Patent No.: US 8,144,996 B1
(45) Date of Patent: Mar. 27, 2012

(54) IMAGE PROCESSING APPARATUS

(75) Inventors: Kanako Saito, Inagi (JP); Toshimitsu Kaneko, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/051,731

(22) Filed: Mar. 18, 2011

(30) Foreign Application Priority Data

Sep. 3, 2010 (JP) .................................. 2010-198185

(51) Int. Cl.
*G06K 9/68* (2006.01)
*H04N 1/40* (2006.01)

(52) U.S. Cl. ........................................ 382/218; 358/448
(58) Field of Classification Search .................. 382/162, 382/195, 218, 235, 276, 307; 358/3.23, 426.04, 358/448, 530; 714/715, 735, 819
See application file for complete search history.

(56) References Cited

U.S. PATENT DOCUMENTS

| 6,005,582 | A * | 12/1999 | Gabriel et al. ................. 345/586 |
| 7,995,854 | B2 * | 8/2011 | Friedhoff et al. ............. 382/260 |
| 2010/0226577 | A1 | 9/2010 | Saito et al. |

OTHER PUBLICATIONS

Saito, K. et al., "Image Processing Apparatus," U.S. Appl. No. 12/878,279, filed Sep. 9, 2010.
Wei, L.Y. et al., "Fast Texture synthesis Using Tree-Structured Vector Quantization," Proc. SIGGRAPH 2000, pp. 479-488, (2000).

* cited by examiner

*Primary Examiner* — Abolfazl Tabatabai
(74) *Attorney, Agent, or Firm* — Finnegan, Henderson, Farabow, Garrett & Dunner, L.L.P.

(57) ABSTRACT

According to an embodiment, an image processing apparatus includes a generation unit. The generation unit generates a texture image by searching for a similar pixel area to a processed pixel area near a processing target pixel in the texture image from a neighboring area at a position corresponding to the processing target pixel in a sample texture image and assigning the processing target pixel a pixel value near the similar pixel area in accordance with a positional relationship between the processed pixel area and the processing target pixel. The generation unit searches for the similar pixel area based on a similarity between a pixel value in a pixel area in the neighboring area and a pixel value in the processed pixel area and a determination result indicating whether each pixel in the neighboring area expresses a same object as that expressed by the processing target pixel.

10 Claims, 15 Drawing Sheets

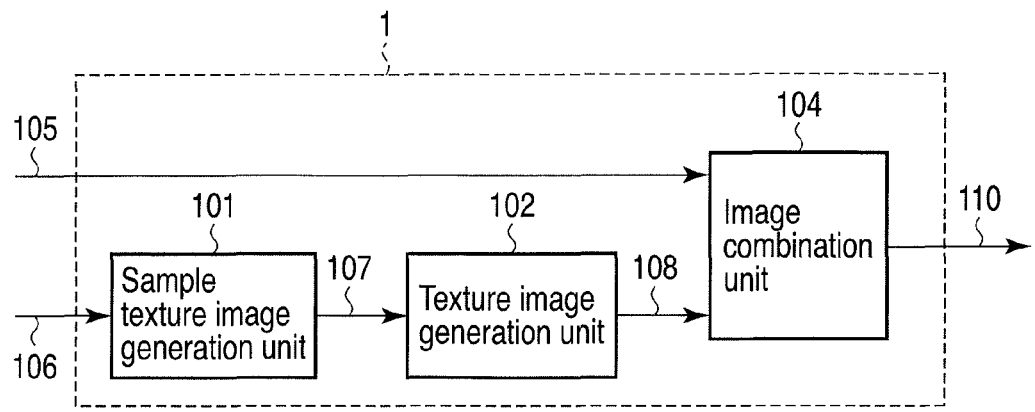
F I G. 1
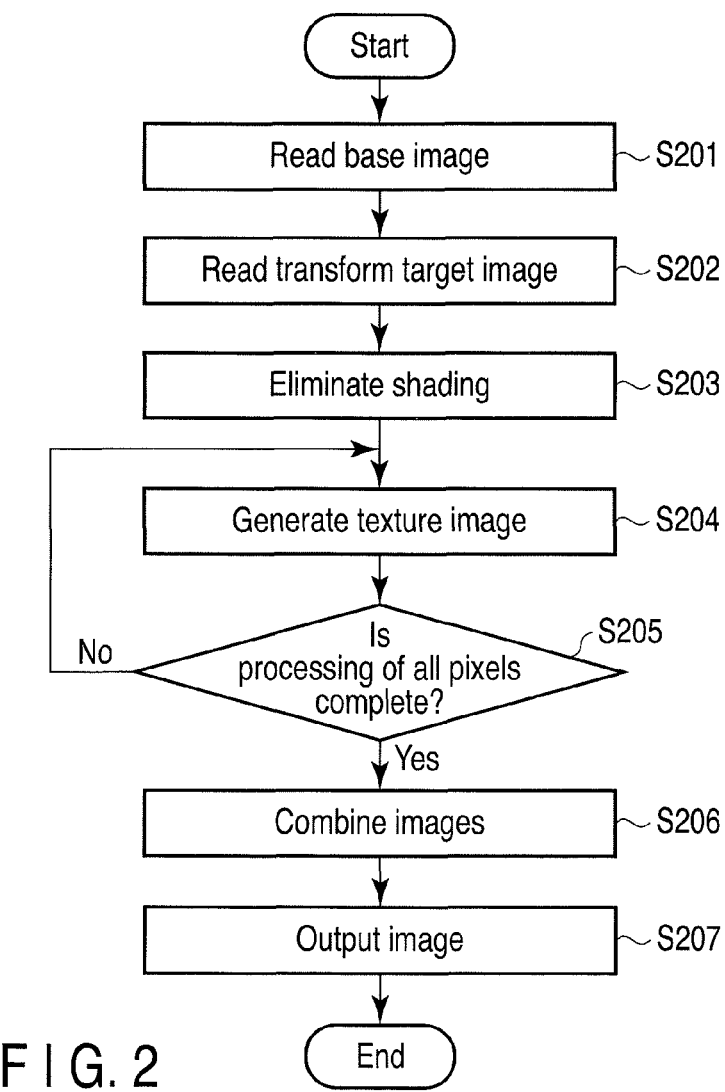
F I G. 2

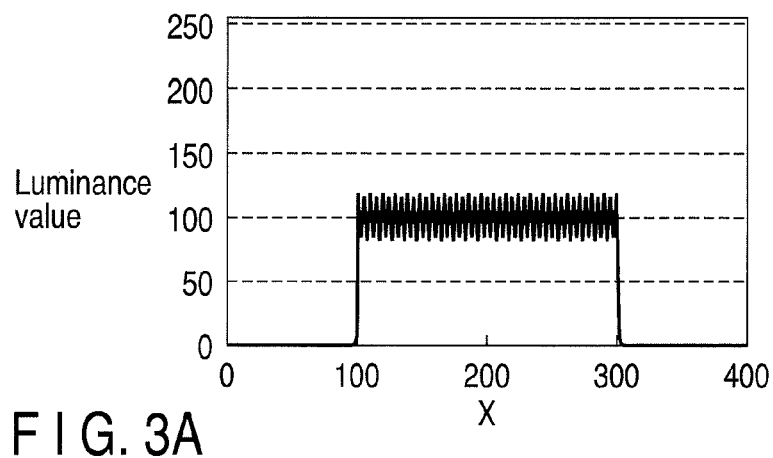
F I G. 3A
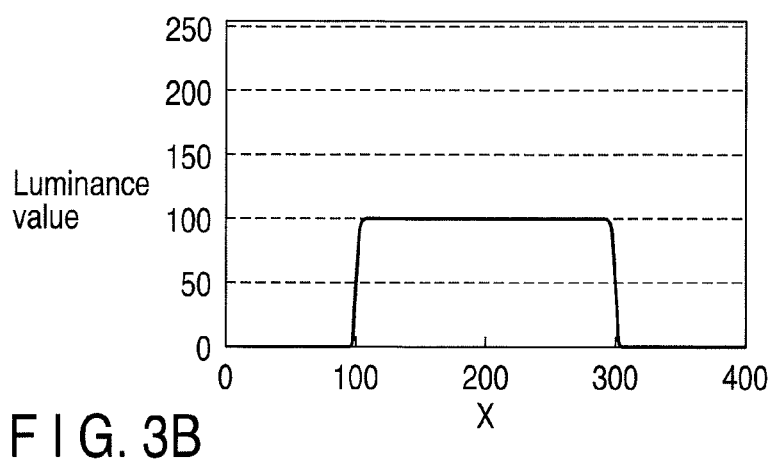
F I G. 3B
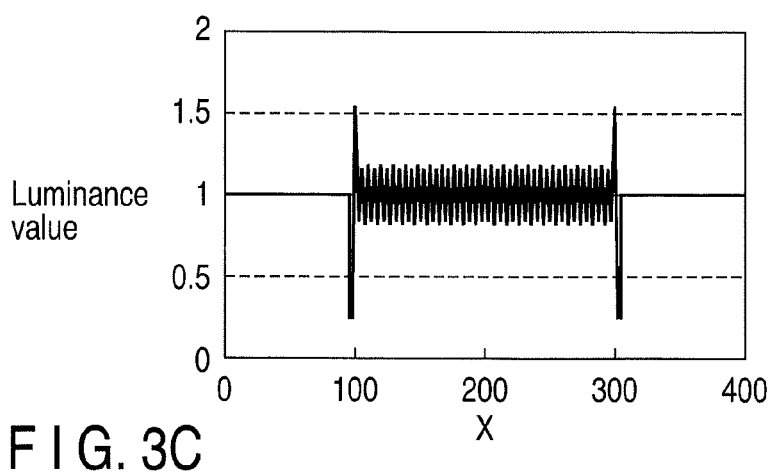
F I G. 3C

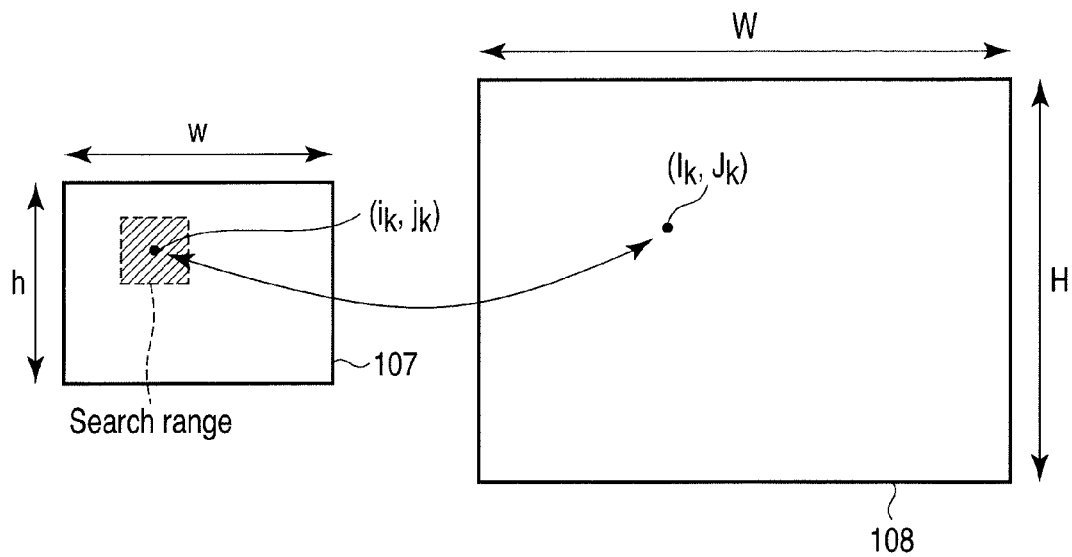
F I G. 4
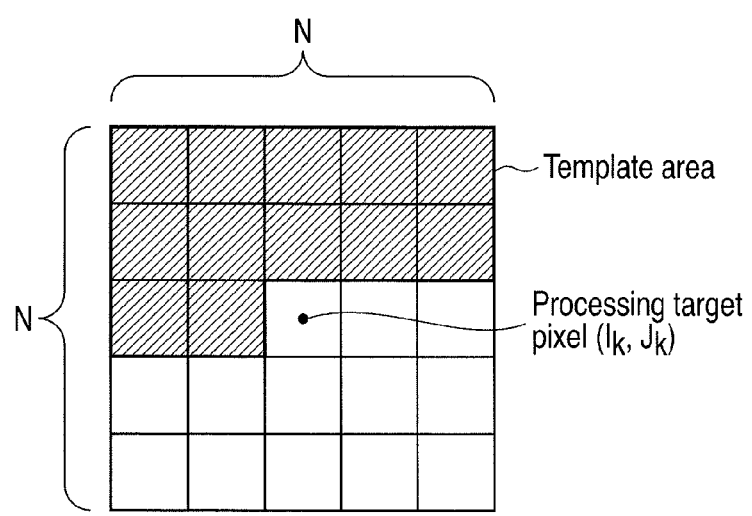
F I G. 5

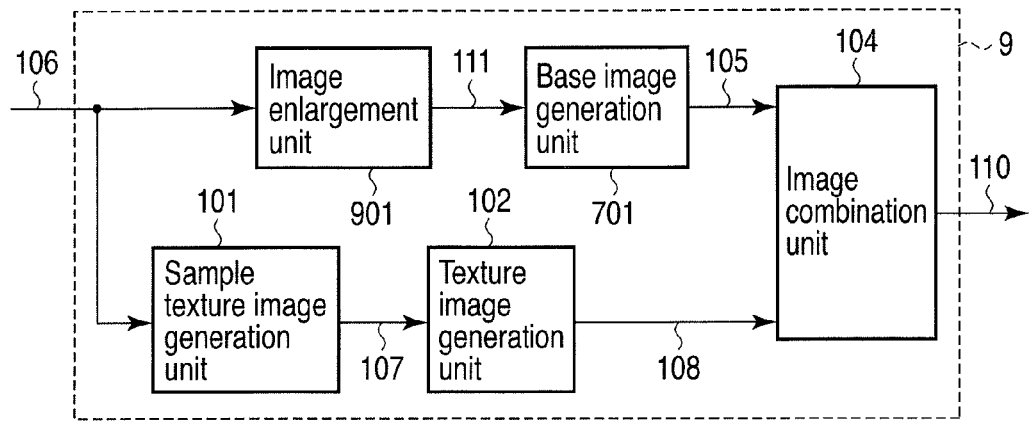
F I G. 9
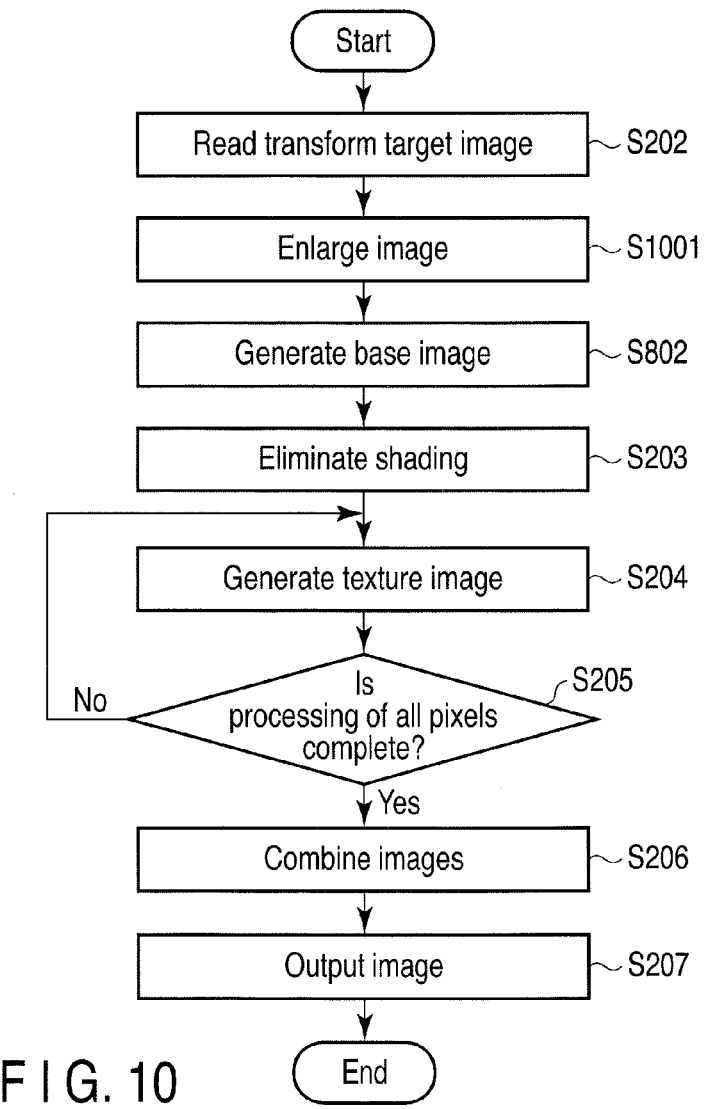
F I G. 10

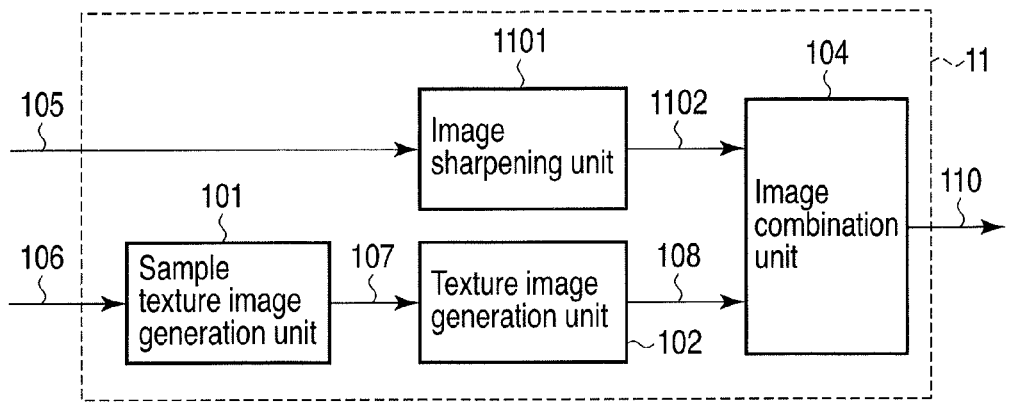
F I G. 11
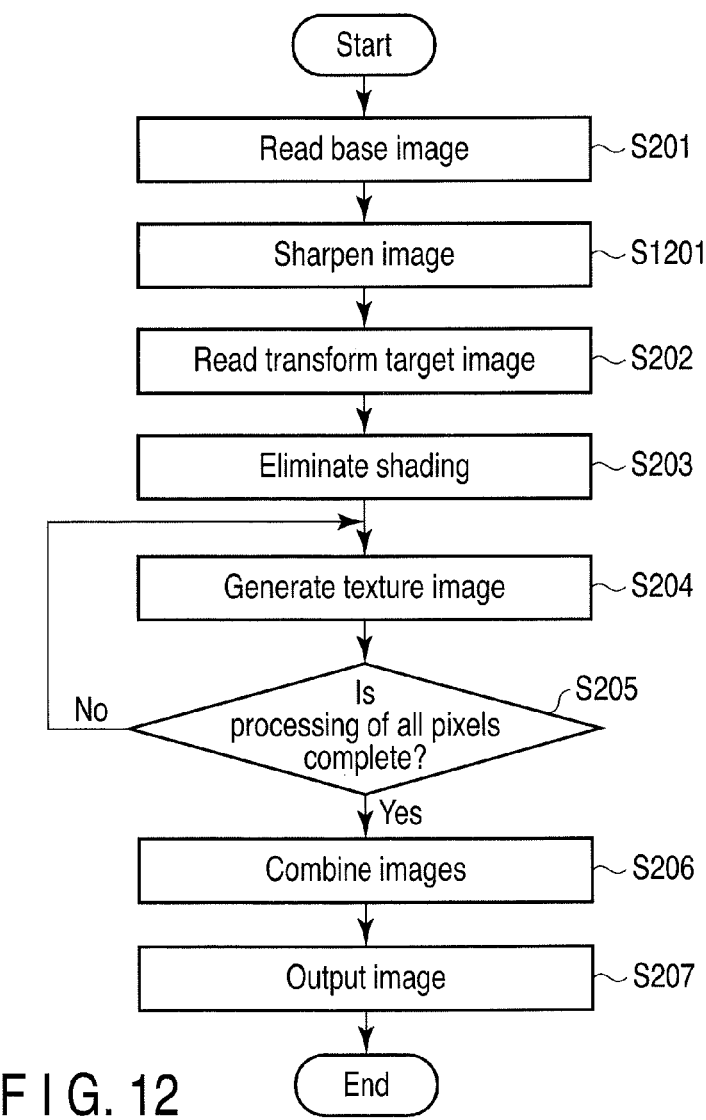
F I G. 12

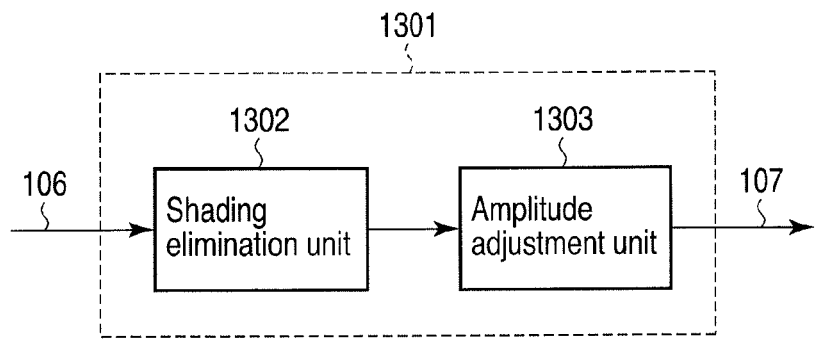
F I G. 13
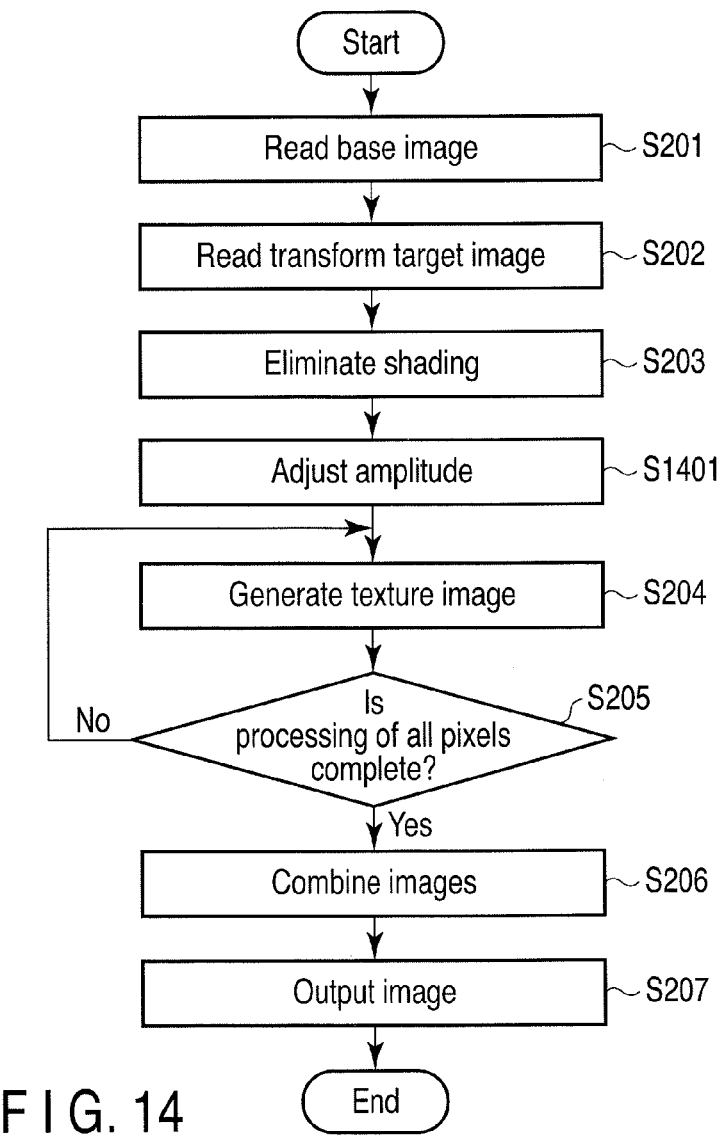
F I G. 14

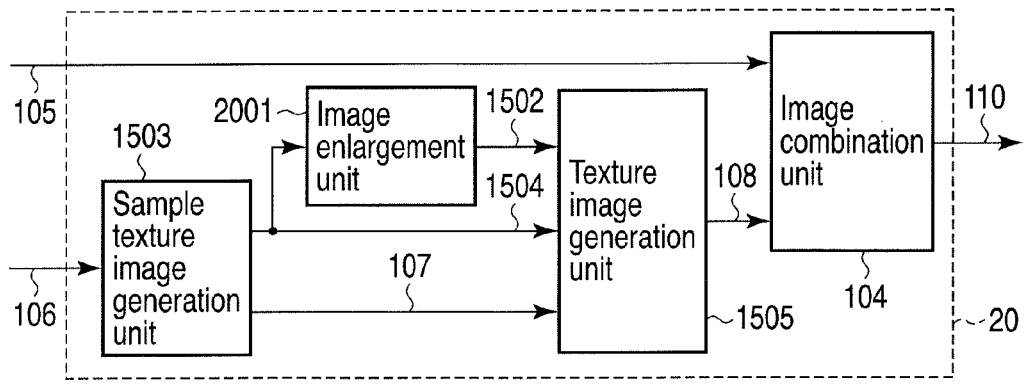
F I G. 20
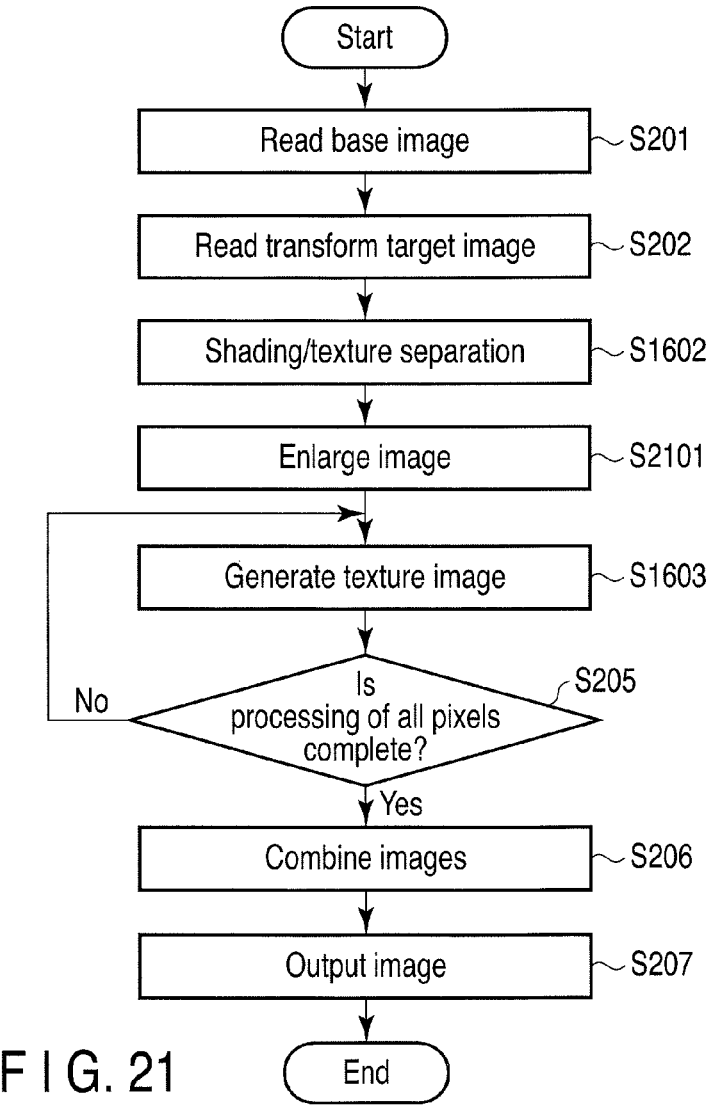
F I G. 21

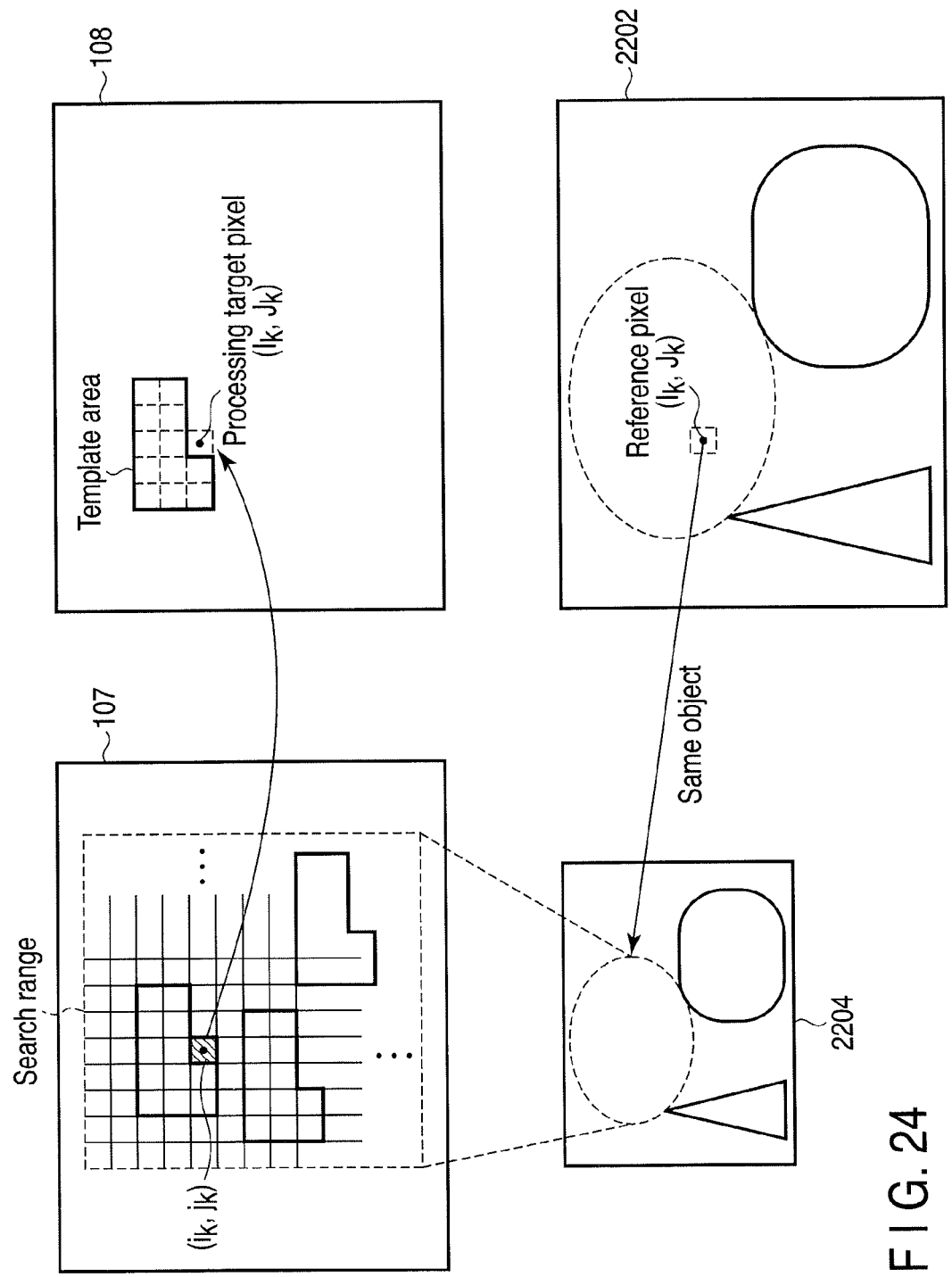
F I G. 24

IMAGE PROCESSING APPARATUS

CROSS-REFERENCE TO RELATED APPLICATIONS

This application is based upon and claims the benefit of priority from Japanese Patent Application No. 2010-198185, filed Sep. 3, 2010; the entire contents of which are incorporated herein by reference.

FIELD

Embodiments described herein relate generally to an image processing apparatus.

BACKGROUND

Digital TV broadcasting allows to play back high-resolution, high-quality images as compared with conventional analog TV broadcasting. In addition, various techniques have been devised to further improve the image quality of such images.

A texture expression is a factor that influences image quality. If, for example, texture deterioration or loss occurs accompanying enlargement transformation of an image, the image quality deteriorates. For this reason, the processing of generating a desired texture and adding it to an image is effective in improving the image quality.

BRIEF DESCRIPTION OF THE DRAWINGS

FIG. 1 is a block diagram exemplifying an image processing apparatus according to a first embodiment;

FIG. 2 is a flowchart exemplifying the operation of the image processing apparatus in FIG. 1;

FIG. 3A is a graph exemplifying the luminance value distribution of an image before shading component-texture component separation;

FIG. 3B is a graph exemplifying the luminance value distribution of a shading component separated from the image in FIG. 3A by the Center/Surround Retinex method;

FIG. 3C is a graph exemplifying the luminance value distribution of a texture component separated from the image in FIG. 3A by the Center/Surround Retinex method;

FIG. 4 is a view for explaining a search range;

FIG. 5 is a view for explaining a template area;

FIG. 9 is a block diagram exemplifying an image processing apparatus according to a third embodiment;

FIG. 10 is a flowchart exemplifying the operation of the image processing apparatus in FIG. 9;

FIG. 11 is a block diagram exemplifying an image processing apparatus according to a fourth embodiment;

FIG. 12 is a flowchart exemplifying the operation of the image processing apparatus in FIG. 11;

FIG. 13 is a block diagram exemplifying a sample texture image generating unit in an image processing apparatus according to a fifth embodiment;

FIG. 14 is a flowchart exemplifying the operation of the image processing apparatus according to the fifth embodiment;

FIG. 20 is a block diagram exemplifying an image processing apparatus according to an eighth embodiment;

FIG. 21 is a flowchart exemplifying the operation of the image processing apparatus in FIG. 20;

FIG. 24 is a view for explaining a technique of generating a texture image in the ninth embodiment.

DETAILED DESCRIPTION

Figure 3D:
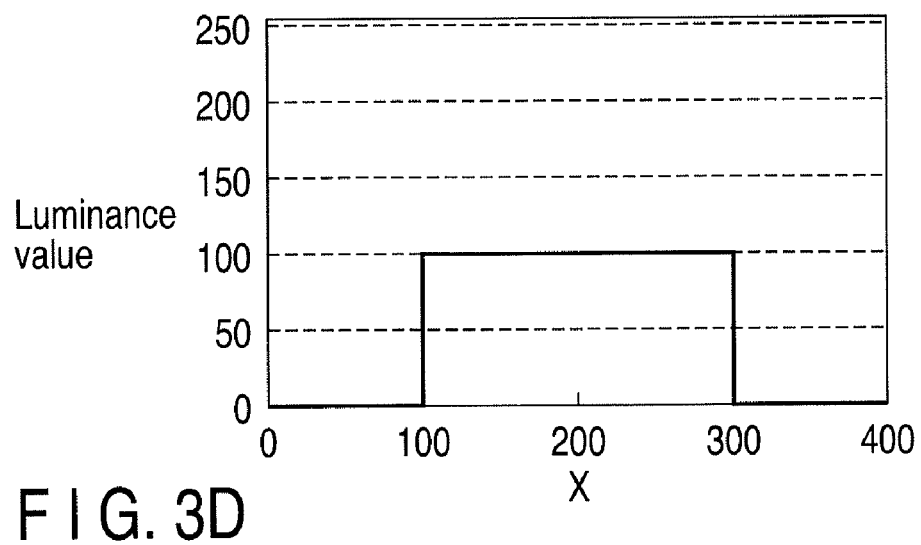
FIG. 3D is a graph exemplifying the luminance value distribution of a shading component separated from the image in FIG. 3A by the skeleton/texture separation method.

The embodiments will be described below with reference to the views of the accompanying drawing.

In general, according to one embodiment, an image processing apparatus includes a first generation unit, a second generation unit and a combination unit. The first generation unit generates a sample texture image holding a texture component of a transform target image. The second generation unit generates a texture image by searching for a similar pixel area to a processed pixel area near a processing target pixel in the texture image larger than the sample texture image from a neighboring area at a position corresponding to the processing target pixel in the sample texture image and assigning the processing target pixel a pixel value near the similar pixel area in accordance with a positional relationship between the processed pixel area and the processing target pixel. Further, the second generation unit searches for the similar pixel area based on a first similarity between a pixel value in a pixel area in the neighboring area and a pixel value in the processed pixel area and a determination result indicating whether each pixel in the neighboring area expresses a same object as that expressed by the processing target pixel. The combination unit generates a combined image by combining the texture image with a base image which holds a non-texture component of the transform target image and has same size as that of the texture image.

In the following description, the same reference numerals denote the same parts in each embodiment, and a description of them will be omitted. In each embodiment, an "image" indicates a digital image having one or more components per pixel. For the sake of simplicity, each embodiment will exemplify the processing for luminance values. However, it is possible to replace this processing with processing for other kinds of components (for example, a color difference component and each component in the RGB format), as needed.

First Embodiment

As shown in FIG. 1, an image processing apparatus 1 according to the first embodiment includes a sample texture image generation unit 101, a texture image generation unit 102, and an image combination unit 104. A base image 105 and a transform target image 106 are input to the image processing apparatus 1. The image processing apparatus 1 processes the transform target image 106 and outputs a combined image 110.

The base image 105 has a size larger than that of the transform target image 106. The base image 105 has the same size as that of the combined image 110. The base image 105 is an image holding shading in the transform target image 106. In this case, shading indicates a gradual change pattern of luminance values. More specifically, the base image 105 may be an enlarged image of the transform target image 106 or an image (non-texture image) holding a rough change pattern of luminance values in the enlarged image. In this embodiment, the base image 105 is prepared in advance and input to the image processing apparatus 1.

For example, it is possible to generate the base image 105 by eliminating a texture component from the enlarged image of the transform target image 106. As techniques of separating a texture component and a shading component (non-texture component) from an image, the skeleton/texture separation method, Center/Surround Retinex method, ε-filter, and the like are known.

Figure 3E:
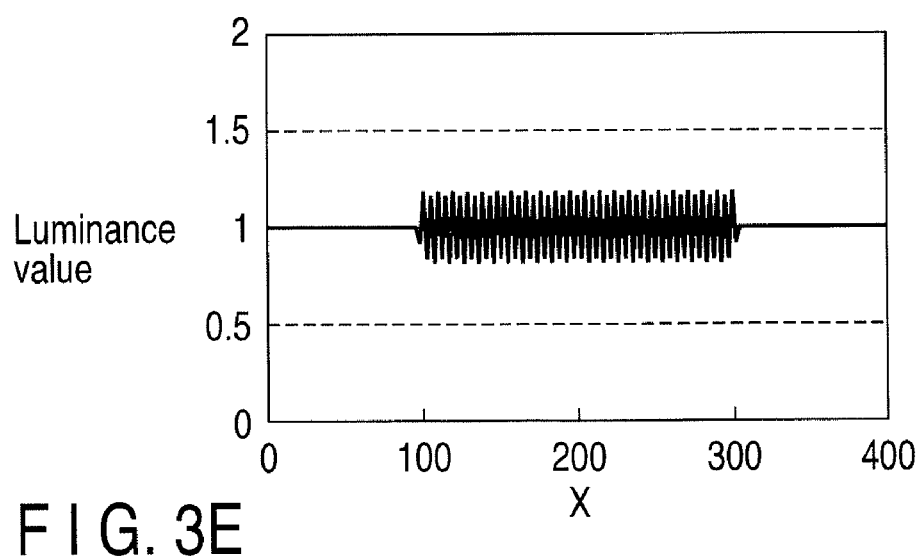
FIG. 3E is a graph exemplifying the luminance value distribution of a texture component separated from the image in FIG. 3A by the skeleton/texture separation method.

FIGS. 3B and 3C respectively show the shading component and the texture component obtained by applying the Center/Surround Retinex method to the image shown in FIG. 3A. FIGS. 3D and 3E respectively show the shading component and the texture component obtained by applying the skeleton/texture separation method to the image shown in FIG. 3A. Note that FIGS. 3A to 3E show one-dimensional luminance value distributions for the sake of simplicity. Referring to FIGS. 3A to 3E, the abscissa represents the coordinates; and the ordinate, the luminance values. According to the skeleton/texture separation method, an edge with a high intensity is retained as a shading component. On the other hand, according to the Center/Surround Retinex method, an edge with a large luminance difference is retained as a texture component.

The skeleton/texture separation method will be briefly described below by using expressions.

The skeleton/texture separation method is a technique of separating an input image I into a skeleton component (corresponding to a non-texture component U) representing a rough structure of an object and a texture component (corresponding to a texture component V) representing minute oscillation on the surface of the object. Skeleton/texture separation methods are roughly classified into an addition separation type expressed by expression (1) given below and a multiplication separation type expressed by expression (2) given below.

$$I(x,y) \approx U(x,y) + V(x,y) \quad (1)$$

$$I(x,y) \approx U(x,y) \times V(x,y) \quad (2)$$

In expressions (1) and (2), (x, y) represents the position (coordinates) of a target pixel. For the sake of simplicity, the skeleton/texture separation method of the multiplication separation type will be described below, and a description of the skeleton/texture separation method of the addition separation type will be omitted. The skeleton/texture separation method of the multiplication separation type can be handled as the minimization problem expressed by expression (3) given below:

$$\inf_{u \in X, v \in G_\mu} \left( J(u) + \frac{1}{2\gamma} \|f - u - v\|_{L_2}^2 \right), \quad (3)$$

$$G_\mu = \{v \in G \mid \|v\|_G \le \mu\}, \gamma > 0, \mu > 0$$

In expression (3), f represents the logarithmic input image function obtained by logarithmically transforming the input image I, u and v respectively represent the logarithmic skeleton function and the logarithmic texture function obtained by logarithmically transforming the skeleton component U and the texture component V, μ represents a parameter for adjusting the upper limit of a G norm of a logarithmic texture component v, γ represents a parameter for adjusting the allowable range of a residual f-u-v, X represents an image function space, G represents an oscillation function space near a dual space of a bounded variation function space, and J(u) represents the Total Variation energy defined by expression (4):

$$J(u) = \int \|\nabla u\| dx dy \quad (4)$$

It is possible to solve the energy minimization problem represented by expression (3) by using the following projection algorithms [1] to [3] (expressions (5) to (7)):

[1] Initialization:

$$u^{(0)} = v^{(0)} = 0 \quad (5)$$

[2] Iterations:

$$v^{(n+1)} = P_{G_\mu}(f - u^{(n)}) \quad (6)$$

$$u^{(n+1)} = f - v^{(n+1)} - P_{G_\gamma}(f - v^{(n+1)})$$

In projection algorithm [2] (expression (6)), $P_{G\lambda}(h)$ represents orthogonal projection to a partial space $G_\lambda$ of a function h.

[3] Convergence test:

$$\text{if } \max(|u^{(n+1)} - u^{(n)}|, |v^{(n+1)} - v^{(n)}|) \le \epsilon \quad (7)$$

then stop the iteration.

Exponentially transforming the functions u and v obtained by the above projection algorithm yields the skeleton component U and the texture component V, as indicated by expressions (8) and (9):

$$U(x,y) = \exp(u(x,y)) \quad (8)$$

$$V(x,y) = \exp(v(x,y)) \quad (9)$$

The skeleton/texture separation method of the multiplication separation type is implemented in the above manner. The Center/Surround Retinex method will be briefly described next by using expressions. The Center/Surround Retinex method is a technique of separating the input image I into an illumination component (corresponding to the non-texture component U) and a reflection component (corresponding to the texture component V), as indicated by expression (10):

input image $I$=illumination component $U$×reflection component $V$ (10)

The illumination component U is estimated by $$U_i(x,y) = G_M(x,y) * I_i(x,y),$$

$$i \in (R,G,B) \quad (11)$$

In expression (11), $G_M(x,y)$ represents a Gaussian filter having a filter size of M×M, and * represents a convolution integral. The Gaussian filter $G_M(x, y)$ is represented by $$G_M(x, y) = K \exp\left(\frac{x^2 + y^2}{2\sigma^2}\right) \quad (12)$$

In expression (12), σ represents a standard deviation, and K is a value satisfying expression (13):

$$\iint G(x,y)dxdy = 1 \quad (13)$$

The reflection component V is estimated by expression (14) by using the input image I and the illumination component U estimated by expression (11).

$$V_i(x, y) = \frac{I_i(x, y)}{U_i(x, y)}, \quad (14)$$
$$i \in (R, G, B)$$

The Center/Surround Retinex method is implemented in the above manner.

The sample texture image generation unit 101 generates a sample texture image 107 based on the transform target image 106. More specifically, the sample texture image generation unit 101 eliminates a shading component from the transform target image 106 to obtain a texture component of the transform target image 106. This texture component corresponds to the sample texture image 107. It is possible to use, for example, the skeleton/texture separation method or the Center/Surround Retinex method to separate a texture component from the transform target image 106. Note that the sample texture image 107 has the same size as that of the transform target image 106. That is, the sample texture image 107 has a size smaller than that of the base image 105 and combined image 110.

The texture image generation unit 102 generates a texture image 108 based on the sample texture image 107 from the sample texture image generation unit 101. The texture image 108 has the same size as that of the base image 105 and combined image 110. That is, the texture image 108 has a size larger than that of the sample texture image 107. Note that a practical example of the operation of the texture image generation unit 102 will be described later.

The image combination unit 104 generates the combined image 110 by combining the base image 105 with the texture image 108 from the texture image generation unit 102. Note that a practical example of the operation of the image combination unit 104 will be described later.

An example of the operation of the image processing apparatus 1 will be described below with reference to FIG. 2.

The image processing apparatus 1 reads the base image 105 (step S201) and transform target image 106 (step S202). Note that in the operation example in FIG. 2, since the base image 105 is not used until step S206, it is possible to execute step S201 at an arbitrary timing before step S206. The image processing apparatus 1 inputs the transform target image 106 read in step S202 to the sample texture image generation unit 101.

The sample texture image generation unit 101 generates the sample texture image 107 by eliminating a shading component from the transform target image 106 read in step S202 (step S203). More specifically, the sample texture image generation unit 101 can generate the sample texture image 107 by separating the texture component V by applying the above skeleton/texture separation method, Center/Surround Retinex method, or the like to the transform target image 106. Note that if the normal direction and illumination conditions in a local area in an image remain constant, an invariant can be obtained relative to a diffusion reflection component.

The texture image generation unit 102 generates each pixel constituting the texture image 108 based on the sample texture image 107 generated in step S203 (the loop of steps S204 and S205).

More specifically, (a) the texture image generation unit 102 selects a pixel, of the pixels constituting the texture image 108, which has not been processed (i.e., a pixel to which no pixel value is assigned) (to be referred to as a processing target pixel hereinafter). (b) The texture image generation unit 102 determines, as a search range, an area near a position corresponding to the processing target pixel in the sample texture image 107. (c) The texture image generation unit 102 searches the search range for a pixel area (to be referred to as a similar area hereinafter) similar in the change pattern of pixel values to a pixel area which has been processed (i.e., a pixel area to which pixel values are assigned) (to be referred to as a template area hereinafter) and is located near the processing target pixel. (d) The texture image generation unit 102 searches for a corresponding pixel near the similar area in accordance with the positional relationship between the template area and the processing target pixel and assigns the pixel value of the corresponding pixel to the processing target pixel.

For example, as shown in FIG. 4, if a position $(I_k, J_k)$ of a processing target pixel in the texture image 108 corresponds to a position $(i_k, j_k)$ in the sample texture image 107, an area near the position $(i_k, j_k)$ is determined as a search range. In the case in FIG. 4, the sample texture image 107 has a size of w×h [pixel], and the texture image 108 has a size of W×H [pixel]. The position $(i_k, j_k)$ can be derived by $$i_k = I_k \times \frac{w}{W}, \quad j_k = J_k \times \frac{h}{H} \quad (15)$$

A search range is typically a pixel area centered on the position $(i_k, j_k)$. For example, a search area is a rectangular area having a size of 20×20 [pixel] or 40×40 [pixel]. Note that the shape and size of a search range are not specifically limited.

The texture image generation unit 102 sequentially generates the pixels of the texture image 108 in raster scan order, for example. In the case of raster scan order, with regard to an arbitrary processing target pixel, pixels occupying the upper side of the processing target pixel and pixels which are located on the same horizontal line as that of the processing target pixel and occupy the left side of the processing target pixel have already been processed. As indicated by the hatched pixel area in FIG. 5, the template area is constituted by processed pixels included in a rectangular area centered on the processing target pixel and having a size of N×N [pixel].

Figure 6:
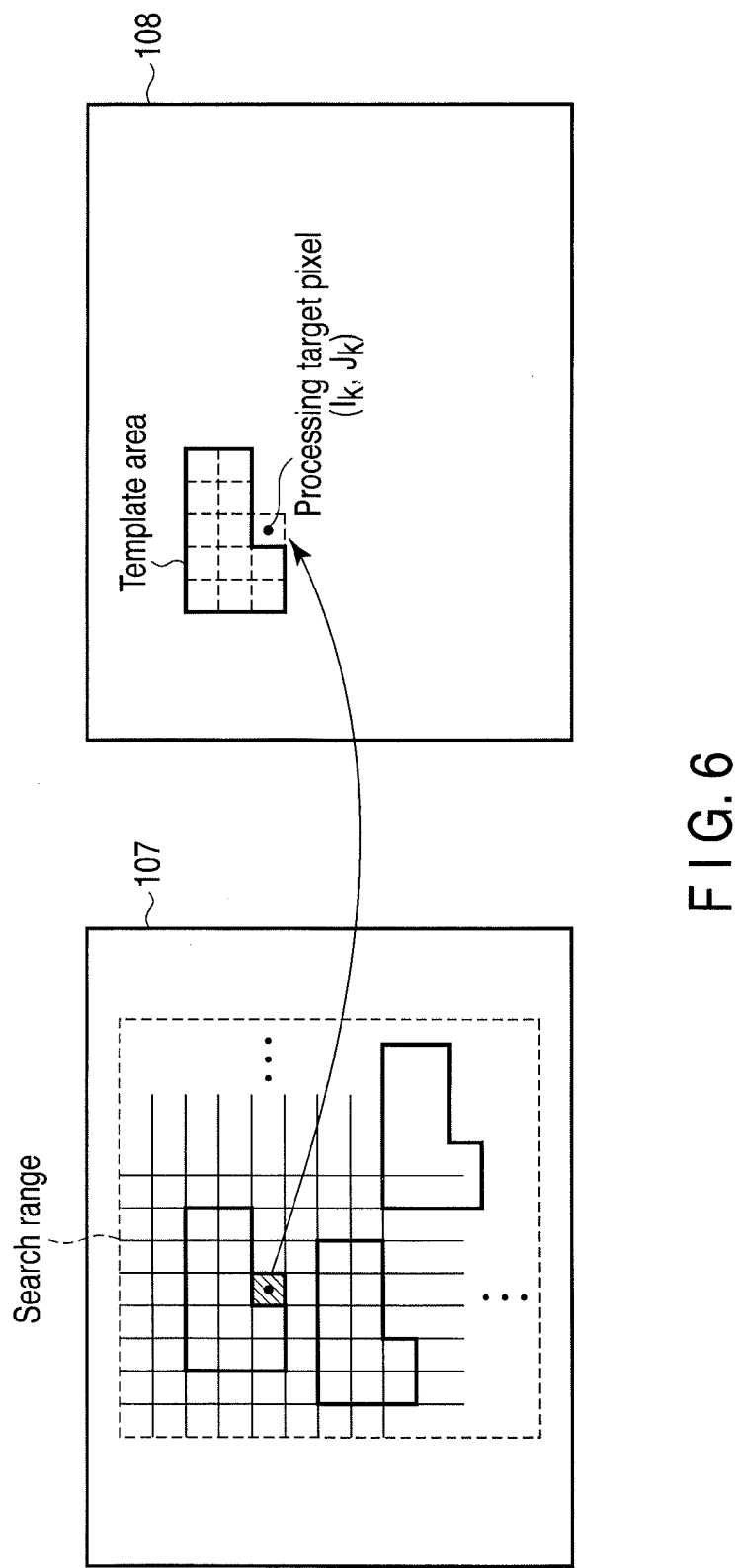
FIG. 6 is a view for explaining a technique of generating a texture image in the first embodiment.

As shown in FIG. 6, the texture image generation unit 102 searches the search range for a pixel area similar in the change pattern of pixel values in the template area. It is possible to evaluate the similarity between a given pixel area and the template area by using, for example, the sum of square differences (SSD). That is, the texture image generation unit 102 searches the search range for a pixel area exhibiting a minimum SSD relative to the template area. The texture image generation unit 102 then searches for a corresponding pixel (the hatched pixel in the case in FIG. 6) near the similar area in accordance with the positional relationship between the template area and the processing target pixel, and assigns the pixel value (luminance value) of this corresponding pixel to the processing target pixel.

Note that as a technique of generating the high-resolution texture image 108 from the sample texture image 107, enlargement transformation such as the bilinear interpolation method or the cubic interpolation method is known. However, generating the texture image 108 by enlargement transformation may degrade or lead to loss of the high-frequency texture component of the sample texture image 107. That is, it is difficult to obtain the high-definition combined image 110 even by combining the texture image 108 generated by enlargement transformation with the base image 105. For this reason, this embodiment uses the above technique to generate the texture image 108 holding the high-frequency texture component of the sample texture image 107.

The image combination unit 104 generates the combined image 110 by combining the base image 105 read in step S201 with the texture image 108 generated in the loop of steps S204 and S205 (step S206). More specifically, the image combination unit 104 generates the combined image 110 according to expression (16) or (17):

$$\text{combined image110} = \text{base image105} + \text{texture image108} \tag{16}$$

$$\text{combined image110} = \text{base image105} \times \text{texture image108} \tag{17}$$

When the sample texture image generation unit 101 is to generate the sample texture image 107 by using the addition separation type technique (for example, the addition type skeleton/texture separation method or the $\epsilon$-filter), the image combination unit 104 generates the combined image 110 according to expression (16). In contrast, when the sample texture image generation unit 101 is to generate the sample texture image 107 by using the multiplication separation type technique (for example, the multiplication type skeleton/texture separation method or the Center/Surround Retinex method), the image combination unit 104 generates the combined image 110 according to expression (17).

The image processing apparatus 1 outputs the combined image 110 generated in step S206 to a display device (not show) or the like (step S207), and terminates the processing.

As described above, the image processing apparatus according to the first embodiment uses a base image which holds shading (non-texture component) of a transform target image, and hence a combined image maintains shading of the transform target image. In addition, since the image processing apparatus according to this embodiment uses the texture image generated based on a sample texture image holding the direction information of a local texture of a transform target image, the directivity of a texture of the transform target image is maintained in a combined image. That is, the image processing apparatus according to the embodiment can obtain a combined image having a high-definition texture.

Second Embodiment

Figure 7:
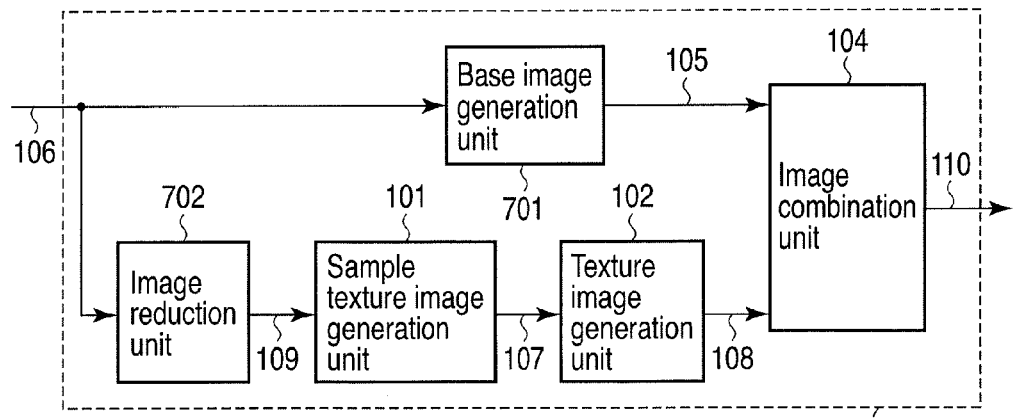
FIG. 7 is a block diagram exemplifying an image processing apparatus according to a second embodiment.

As shown in FIG. 7, an image processing apparatus 7 according to the second embodiment includes a base image generation unit 701, an image reduction unit 702, a sample texture image generation unit 101, a texture image generation unit 102, and an image combination unit 104. A transform target image 106 is input to the image processing apparatus 7. The image processing apparatus 7 processes the transform target image 106 and outputs a combined image 110. Note that in this embodiment, the transform target image 106 has the same size as that of a base image 105, texture image 108, and combined image 110.

The base image generation unit 701 generates the base image 105 based on the transform target image 106. For example, the base image generation unit 701 generates the base image 105 by separating a non-texture component from the transform target image 106 (that is, eliminating a texture component). It is possible to use each of the above techniques to separate a non-texture component. Alternatively, the base image generation unit 701 may directly generate the transform target image 106 as the base image 105. In this case, it is not necessary to use the base image generation unit 701.

The image reduction unit 702 generates a reduced image 109 by reduction transformation of the transform target image 106. If the size of the transform target image 106 decreases K times (where K is an arbitrary real number satisfying 0<K<1.0), the frequency of the texture pattern held by the transform target image 106 increases to 1/K. Obviously, the reduced image 109 has a size smaller than that of the transform target image 106.

The sample texture image generation unit 101 generates a sample texture image 107 based on the reduced image 109. In this embodiment, the sample texture image 107 has the same size as that of the reduced image 109.

Figure 8:
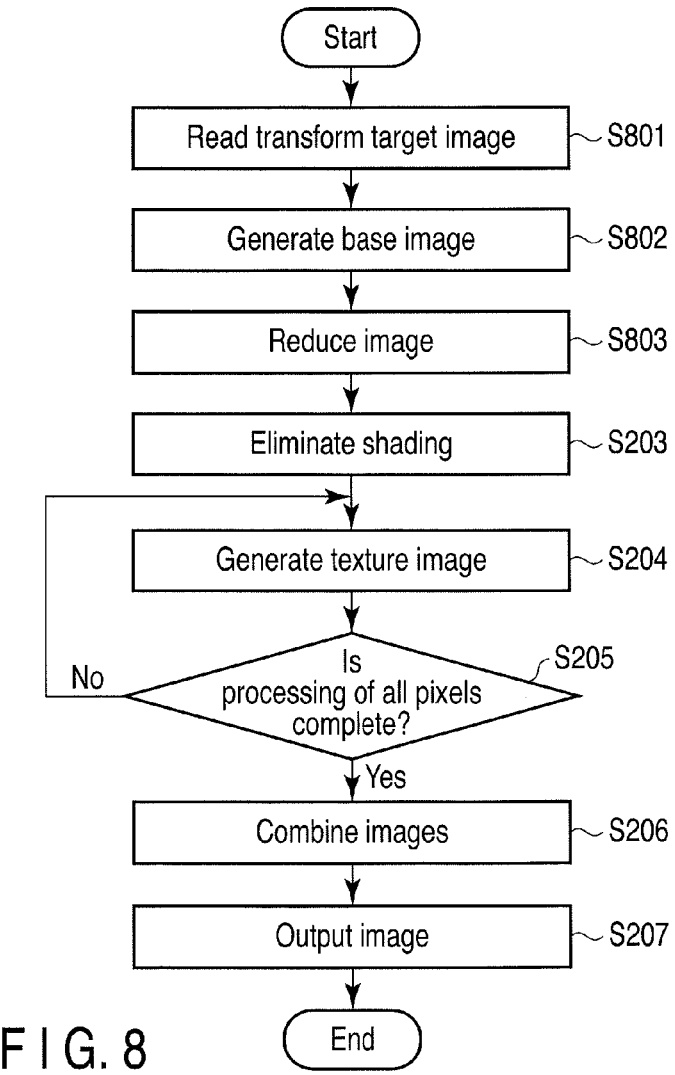
FIG. 8 is a flowchart exemplifying the operation of the image processing apparatus in FIG. 7.

An example of the operation of the image processing apparatus 7 will be described below with reference to FIG. 8.

The image processing apparatus 7 reads the transform target image 106 (step S801). The image processing apparatus 7 inputs the transform target image 106 read in step S801 to the base image generation unit 701 and the image reduction unit 702.

The base image generation unit 701 generates the base image 105 based on the transform target image 106 read in step S801 (step S802). Note that in the operation example in FIG. 8, since the base image 105 is not used until step S806, it is possible to execute step S802 at an arbitrary timing before step S806.

The image reduction unit 702 generates the reduced image 109 by performing reduction transformation of the transform target image 106 read in step S801 (step S803). The sample texture image generation unit 101 generates the sample texture image 107 by eliminating a shading component from the reduced image 109 generated in step S803 (step S203).

The image combination unit 104 generates the combined image 110 by combining the base image 105 generated in step S802 with the texture image 108 generated in the loop of steps S204 and S205 (step S206).

As described above, the image processing apparatus according to the second embodiment generates a texture image based on a reduced image of a transform target image. Therefore, the image processing apparatus according to this embodiment can obtain a combined image with a texture pattern having a higher frequency and is similar to the texture pattern held by the transform target image. That is, the image processing apparatus according to the embodiment can obtain a combined image having a high-definition texture.

Third Embodiment

As shown in FIG. 9, an image processing apparatus 9 according to the third embodiment includes an image enlargement unit 901, a base image generation unit 701, a sample texture image generation unit 101, a texture image generation unit 102, and an image combination unit 104. A transform target image 106 is input to the image processing apparatus 9. The image processing apparatus 9 processes the transform target image 106 and outputs a combined image 110. Note that in this embodiment, the transform target image 106 has the same size as that of a sample texture image 107.

The image enlargement unit 901 generates an enlarged image 111 by performing enlargement transformation of the transform target image 106. The enlarged image 111 has the same size as that of a base image 105, texture image 108, and combined image 110. The base image generation unit 701 generates the base image 105 based on the enlarged image 111.

Enlargement transformation is implemented by, for example, the nearest neighbor interpolation method, linear interpolation method, cubic convolution method, or bicubic interpolation method. In order to suppress deterioration in the image quality of the combined image 110, it is preferable to use enlargement transformation that can generate the enlarged image 111 with little blur.

An example of the operation of the image processing apparatus 9 will be described below with reference to FIG. 10.

The image enlargement unit 901 generates the enlarged image 111 by performing enlargement transformation of the transform target image 106 read in step S202 (step S1001). The base image generation unit 701 generates the base image 105 based on the enlarged image 111 generated in step S1001 (step S802).

Note that in the operation example in FIG. 10, since the base image 105 is not used until step S206, it is possible to execute steps S1001 and S802 at arbitrary timings before step S206.

The image combination unit 104 generates the combined image 110 by combining the base image 105 generated in step S802 with the texture image 108 generated in the loop of steps S204 and S205 (step S206).

As described above, the image processing apparatus according to the third embodiment generates a base image based on an enlarged image of a transform target image. The transform target image holds a texture pattern having a higher frequency than that of the enlarged image. Therefore, the image processing apparatus according to this embodiment can obtain a combined image with a texture pattern having a higher frequency and is similar to the texture pattern of the enlarged image. That is, the image processing apparatus according to the embodiment can obtain a combined image having a high-definition texture.

Fourth Embodiment

As shown in FIG. 11, an image processing apparatus 11 according to the fourth embodiment includes an image sharpening unit 1101, a sample texture image generation unit 101, a texture image generation unit 102, and an image combination unit 104. A base image 105 and a transform target image 106 are input to the image processing apparatus 11. The image processing apparatus 11 processes the transform target image 106 and outputs a combined image 110. Note that in this embodiment, the transform target image 106 has the same size as that of a sample texture image 107.

The image sharpening unit 1101 generates a sharpened base image 1102 by sharpening the base image 105. The sharpened base image 1102 has the same size as that of the base image 105, texture image 108, and combined image 110. For image sharpening, an arbitrary sharpening technique such as an unsharp masking method can be used. The image combination unit 104 generates the combined image 110 by combining the sharpened base image 1102 from the image sharpening unit 1101 with the texture image 108 from the texture image generation unit 102.

An example of the operation of the image processing apparatus 11 will be described below with reference to FIG. 12.

The image sharpening unit 1101 generates the sharpened base image 1102 by sharpening the base image 105 read in step S201 (step S1201). Note that in the operation example in FIG. 12, since the sharpened base image 1102 is not used until step S206, it is possible to execute steps S201 and S1201 at arbitrary timings before step S206.

The image combination unit 104 generates the combined image 110 by combining the sharpened base image 1102 generated in step S1201 with the texture image 108 generated in the loop of steps S204 and S205 (step S206).

As has been described above, the image processing apparatus according to the fourth embodiment generates a combined image by combining a texture image with a sharpened base image. Therefore, the image processing apparatus according to this embodiment can improve the sharpness of the texture and edges in the combined image.

Fifth Embodiment

An image processing apparatus according to the fifth embodiment corresponds to an arrangement obtained by replacing the sample texture image generation unit 101 in the image processing apparatus according to each embodiment described above with a sample texture image generation unit 1301. For the sake of simplicity, assume that the sample texture image generation unit 101 in the image processing apparatus 1 according to the first embodiment is replaced by the sample texture image generation unit 1301. As shown in FIG. 13, the sample texture image generation unit 1301 includes a shading elimination unit 1302 and an amplitude adjustment unit 1303.

The shading elimination unit 1302 eliminates a shading component from a transform target image 106 like the sample texture image generation unit 101 to obtain a texture component (to be referred to as a shading-eliminated image hereinafter) of the transform target image 106. The shading elimination unit 1302 inputs the shading-eliminated image to the amplitude adjustment unit 1303.

The amplitude adjustment unit 1303 generates a sample texture image 107 by adjusting the amplitude of the shading-eliminated image from the shading elimination unit 1302. For example, the amplitude adjustment unit 1303 attenuates the luminance amplitude of the shading-eliminated image. More specifically, the amplitude adjustment unit 1303 adjusts the amplitude of the shading-eliminated image according to expression (18) or (19):

$$V'(x,y)=V(x,y)a \qquad (18)$$

$$V'(x,y)=a \cdot V(x,y) \qquad (19)$$

When the shading elimination unit 1302 is to generate a shading-eliminated image by using an addition separation type technique (for example, the addition type skeleton/texture separation method or the ε-filter), the amplitude adjustment unit 1303 generates the sample texture image 107 according to expression (19). When the shading elimination unit 1302 is to generate a shading-eliminated image by using a multiplication separation type technique (for example, the multiplication type skeleton/texture separation method or the Center/Surround Retinex method), the amplitude adjustment unit 1303 generates the sample texture image 107 according to expression (18).

In expressions (18) and (19), V(x, y) represents the pixel value at the position (coordinates) (x, y) in the shading-eliminated image, V'(x, y) represents the pixel value at the position (x, y) in the sample texture image 107, and a represents an amplitude adjustment coefficient. For example, when the amplitude of a texture component is to be attenuated to ½, amplitude adjustment coefficient a=0.5.

It is possible to manually set the amplitude adjustment coefficient a to an arbitrary value or automatically set it to a specific value. When automatically setting the amplitude adjustment coefficient a in accordance with the size ratio between the transform target image 106 and a base image 105, it is possible to use expression (20) given below:

$$a = \frac{W_V}{W_{V'}} \text{ or } a = \frac{H_V}{H_{V'}} \quad (20)$$

In expression (20), $W_V$ represents the horizontal size [pixel] of the transform target image 106, $W_{V'}$ represents the horizontal size [pixel] of the base image 105, $H_V$ represents the vertical size [pixel] of the transform target image 106, and $H_{V'}$ represents the vertical size [pixel] of the base image 105.

An example of the operation of the image processing apparatus according to this embodiment will be described below with reference to FIG. 14.

The shading elimination unit 1302 generates a shading-eliminated image by eliminating a shading component from the transform target image 106 read in step S202 (step S203). The amplitude adjustment unit 1303 generates the sample texture image 107 by adjusting the amplitude of the shading-eliminated image generated in step S203 (step S1401).

A texture image generation unit 102 generates each pixel constituting a texture image 108 based on the sample texture image 107 generated in step S1401 (the loop of steps S204 and S205).

As described above, the image processing apparatus according to the fifth embodiment generates a sample texture image by adjusting the amplitude of the texture component of the transform target image. The image processing apparatus according to this embodiment can obtain a combined image which has the same frequency as that of the texture of the transform target image but gives a different impression.

Sixth Embodiment

Figure 15:
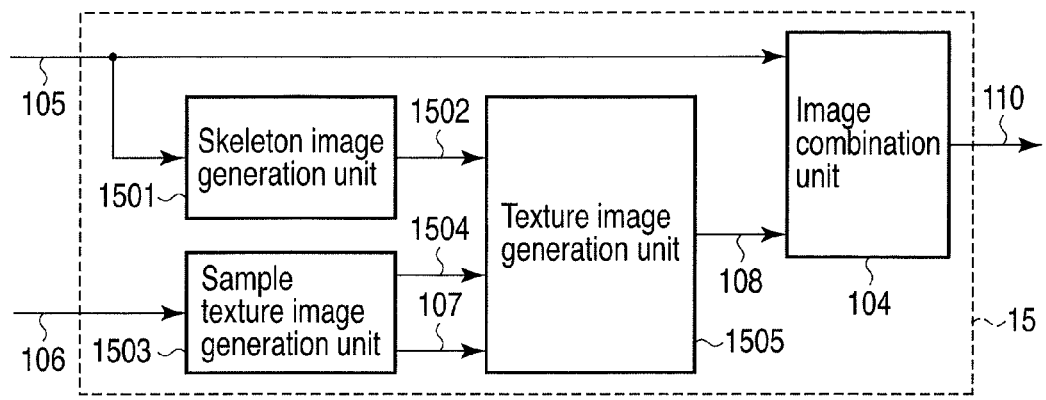
FIG. 15 is a block diagram exemplifying an image processing apparatus according to a sixth embodiment.

As shown in FIG. 15, an image processing apparatus 15 according to the sixth embodiment includes a skeleton image generation unit 1501, a sample texture image generation unit 1503, a texture image generation unit 1505, and an image combination unit 104. A base image 105 and a transform target image 106 are input to the image processing apparatus 15. The image processing apparatus 15 processes the transform target image 106 and outputs a combined image 110.

The skeleton image generation unit 1501 generates a base skeleton image 1502 by eliminating a texture component from the base image 105. The skeleton image generation unit 1501 inputs the base skeleton image 1502 to the texture image generation unit 1505. More specifically, the skeleton image generation unit 1501 can eliminate a texture component from the base image 105 by using one of the techniques described above. For example, the skeleton image generation unit 1501 may generate a non-texture component U obtained by using the skeleton/texture separation method as the base skeleton image 1502, or may generate an illumination component U obtained by using the Center/Surround Retinex method as the base skeleton image 1502. If the base image 105 is a non-texture image, the skeleton image generation unit 1501 may directly generate the base image 105 as the base skeleton image 1502. In this case, it is not necessary to use the skeleton image generation unit 1501. That is, the base skeleton image is formed from only the non-texture image.

As will be described later, the base skeleton image 1502 is used to determine the identity of an object. The base skeleton image 1502 therefore preferably does not include a fine density pattern expressing the texture on the surface of the object in the base image 105. In addition, in the base skeleton image 1502, an edge expressing an object boundary is preferably sharp. For this reason, the skeleton image generation unit 1501 may generate the base skeleton image 1502 based on a sharpened base image 1102 described above in place of the base image 105.

The sample texture image generation unit 1503 generates a sample texture image 107 based on the transform target image 106 like the sample texture image generation unit 101 or the sample texture image generation unit 1301. The sample texture image generation unit 1503 also generates a sample skeleton image 1504 based on the transform target image 106. The sample skeleton image 1504 corresponds to a non-texture component of the transform target image 106. The sample texture image generation unit 1503 inputs a sample texture image 107 and the sample skeleton image 1504 to the texture image generation unit 1505.

Like the base skeleton image 1502, the sample skeleton image 1504 is used to determine the identity of an object. The sample skeleton image 1504 therefore preferably does not include a fine density pattern expressing the texture on the surface of the object in the transform target image 106. In addition, in the sample skeleton image 1504, an edge expressing an object boundary is preferably sharp. For this reason, the sample texture image generation unit 1503 may generate the sample skeleton image 1504 based on an image obtained by sharpening the transform target image 106 in place of the transform target image 106.

The base skeleton image 1502 and the sample skeleton image 1504 may be grayscale images or images having a plurality of color components. With regard to color systems such as RGB, YUV, and L*a*b*, it is possible to generate a skeleton image by using one or two color components or generate a skeleton image by using all three color components. When generating a skeleton image by using a plurality of color components, it is possible to apply the Center/Surround Retinex method or the skeleton/texture separation method to each color component. In addition, in a skeleton image having a plurality of color components, it is possible to express the similarity between pixels by using the square difference of the distance or the absolute value of the difference between the two points in a color space.

The texture image generation unit 1505 generates a texture image 108 based on the sample texture image 107 from the sample texture image generation unit 1503. As will be described later, the texture image generation unit 1505 determines the identity of an object based on the base skeleton image 1502 from the skeleton image generation unit 1501 and the sample skeleton image 1504 from the sample texture image generation unit 1503. The texture image generation unit 1505 generates the texture image 108 by using the determination result.

The image combination unit 104 generates a combined image 110 by combining the base image 105 with the texture image 108 from the texture image generation unit 1505.

Figure 16:
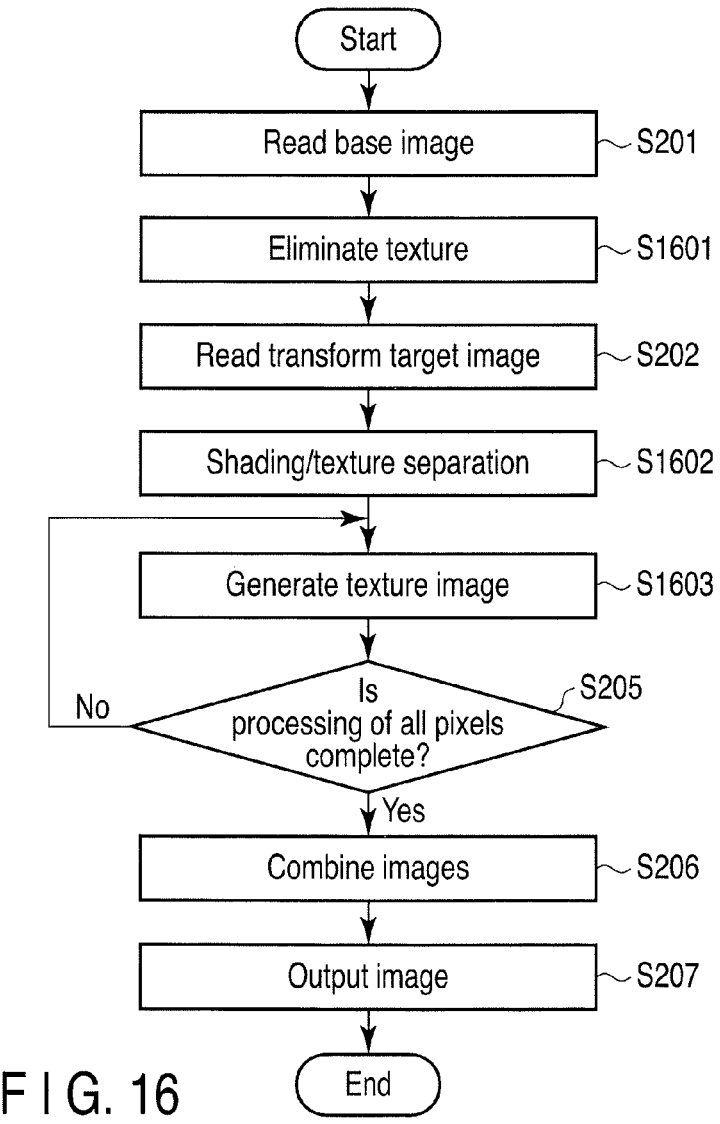
FIG. 16 is a flowchart exemplifying the operation of the image processing apparatus in FIG. 15.

An example of the operation of the image processing apparatus 15 will be described below with reference to FIG. 16.

The skeleton image generation unit 1501 generates the base skeleton image 1502 by eliminating a texture component from the base image 105 read in step S201 (step S1601). The sample texture image generation unit 1503 generates the sample skeleton image 1504 and the sample texture image 107 by separating a shading component and a texture component from the transform target image 106 read in step S202 (step S1602). Note that it is possible to execute the series of processing in steps S201 and S1601 and the series of processing in steps S202 and S1602 in reverse order or in parallel.

The texture image generation unit 1505 generates each pixel constituting the texture image 108 based on the sample texture image 107 generated in step S1602 (the loop of steps S1603 and S205).

The texture image generation unit 1505 differs from the texture image generation unit 102 in that it searches for a similar area by using the identity determination result on an object.

Figure 17:
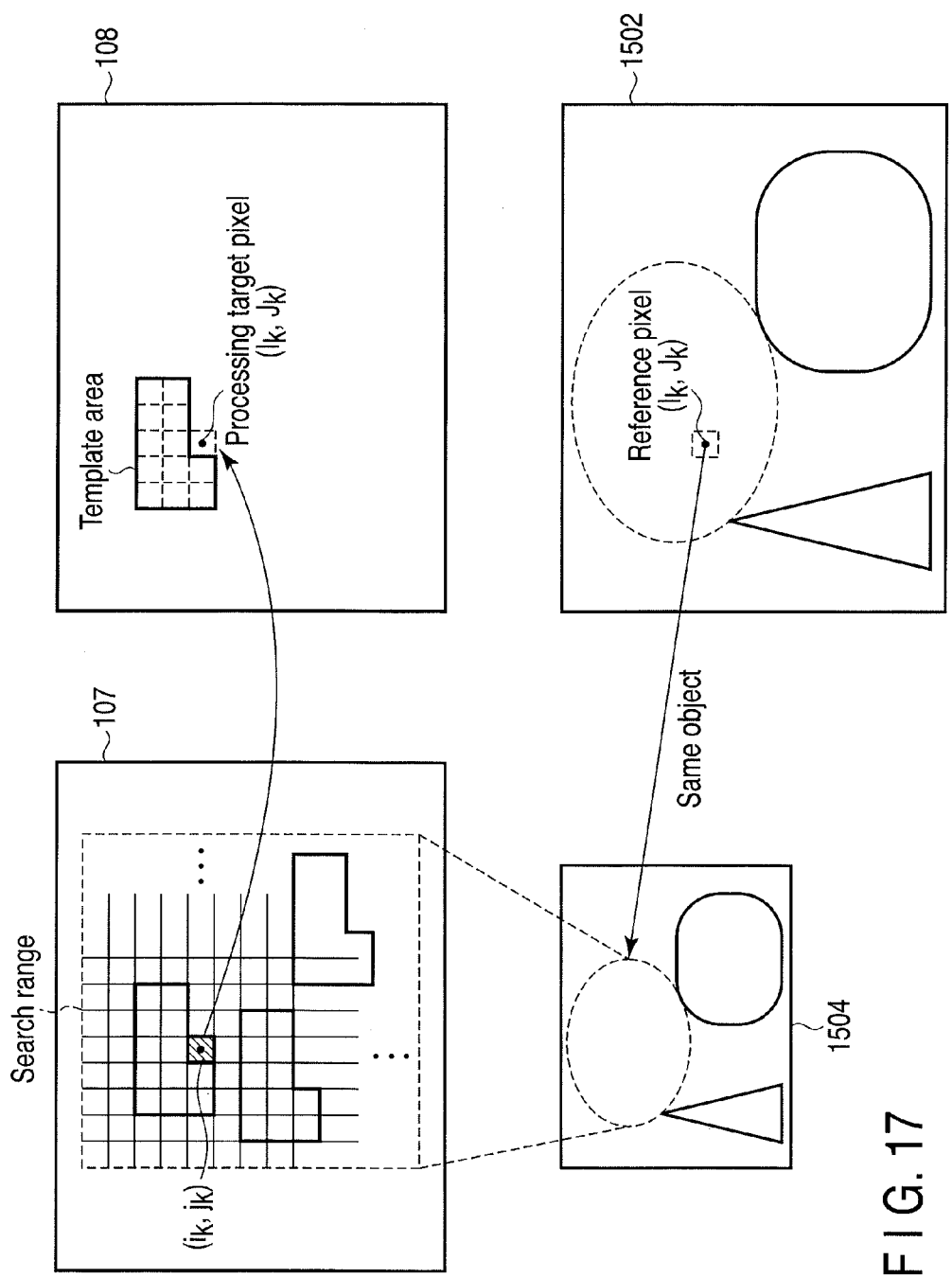
FIG. 17 is a view for explaining a technique of generating a texture image in the sixth embodiment.

As shown in FIG. 17, the texture image generation unit 1505 determines the identity of an object with reference to a pixel (to be referred to as a reference pixel hereinafter) at a position corresponding to a processing target pixel in the base skeleton image 1502.

For example, the texture image generation unit 1505 determines whether the similarity between each pixel included in a neighboring area at a position corresponding to a processing target pixel in the sample skeleton image 1504 and a reference pixel (for example, the square difference of the pixel values or the absolute value of the difference between the pixel values) is equal to or less than a threshold Th. If the similarity between a given pixel and the reference pixel is equal to or less than the threshold Th, the texture image generation unit 1505 determines that the corresponding pixel in the texture image 108 expresses the same object as that expressed by the processing target pixel. If the similarity between a given pixel and the reference pixel exceeds the threshold Th, the texture image generation unit 1505 determines that the corresponding pixel in the texture image 108 does not express the same object as that expressed by the processing target pixel.

Since skeleton images (the base skeleton image 1502 and the sample skeleton image 1504) hold rough changes in luminance value, they tend to cause large difference between pixels expressing different objects.

The texture image generation unit 1505 narrows down the search range to pixels determined to express the same object as that expressed by the processing target pixel in the texture image 108. In other words, the texture image generation unit 1505 excludes pixels determined not to express the same object as that expressed by the processing target pixel in the texture image 108.

In addition, the identity determination result on an object (i.e., the similarity between an object expressed by a processing target pixel and an object expressed by each pixel included in a neighboring area) can be expressed by a multilevel value (a real number between or equal to 0 and 1) instead of a binary value (0 or 1). When expressing the identity determination result on an object with a multilevel value, the texture image generation unit 1505 may search the search range for a pixel area in which the weighted sum of the SSD between itself and a template area and the total sum of identity determination results is minimum.

Alternatively, when expressing the identity determination result on an object with a multilevel value, the texture image generation unit 1505 may assign each pixel in the search range a weight corresponding to a determination result. That is, the texture image generation unit 1505 may search the search range for a pixel area in which the weighted sum of square differences between itself and a template area is minimum.

The image combination unit 104 generates the combined image 110 by combining the base image 105 read in step S201 with the texture image 108 generated in the loop of steps S1603 and S205 (step S206).

As described above, the image processing apparatus according to the sixth embodiment searches for a similar area by using the identity determination result on an object. The image processing apparatus according to this embodiment is robust against an error caused by the texture of a false object being assigned to a processing target pixel near an object boundary, and easily avoids texture failure of a combined image due to the propagation of such an error. That is, the image processing apparatus according to the embodiment can obtain a high-definition combined image which accurately retains the texture of a transform target image including a plurality of objects.

Seventh Embodiment

Figure 18:
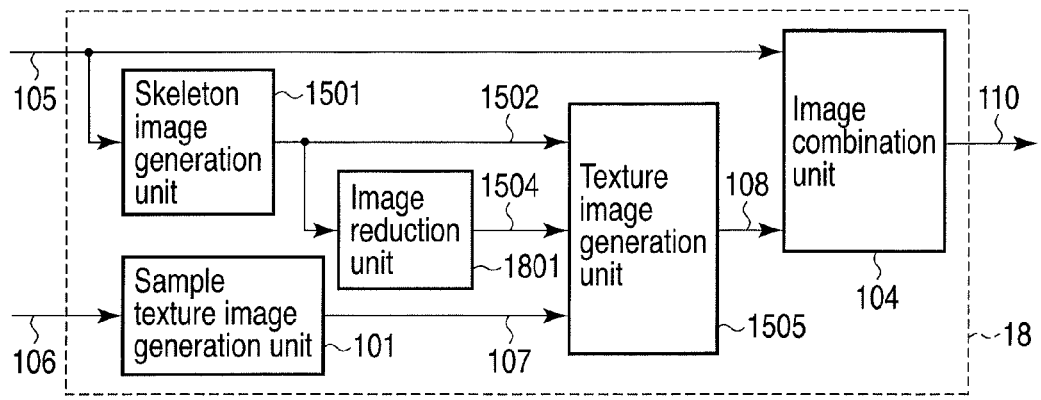
FIG. 18 is a block diagram exemplifying an image processing apparatus according to a seventh embodiment.

As shown in FIG. 18, an image processing apparatus 18 according to the seventh embodiment includes a skeleton image generation unit 1501, an image reduction unit 1801, a sample texture image generation unit 101, a texture image generation unit 1505, and an image combination unit 104. A base image 105 and a transform target image 106 are input to the image processing apparatus 18. The image processing apparatus 18 processes the transform target image 106 and outputs a combined image 110.

The skeleton image generation unit 1501 generates a base skeleton image 1502 by eliminating a texture component from the base image 105. The skeleton image generation unit 1501 inputs the base skeleton image 1502 to the texture image generation unit 1505 and the image reduction unit 1801.

The image reduction unit 1801 generates a sample skeleton image 1504 by performing reduction transformation of the base skeleton image 1502 from the skeleton image generation unit 1501. The image reduction unit 1801 inputs the sample skeleton image 1504 to the texture image generation unit 1505.

Reduction transformation is implemented by, for example, the nearest neighbor interpolation method, linear interpolation method, or cubic convolution method (bicubic interpolation method). In order to prevent deterioration in the accuracy of identity determination on an object, it is preferable to use reduction transformation that can generate the sample skeleton image 1504 with little blur.

The texture image generation unit 1505 determines the identity of the object described above based on the base skeleton image 1502 from the skeleton image generation unit 1501 and the sample skeleton image 1504 from the image reduction unit 1801.

Figure 19:
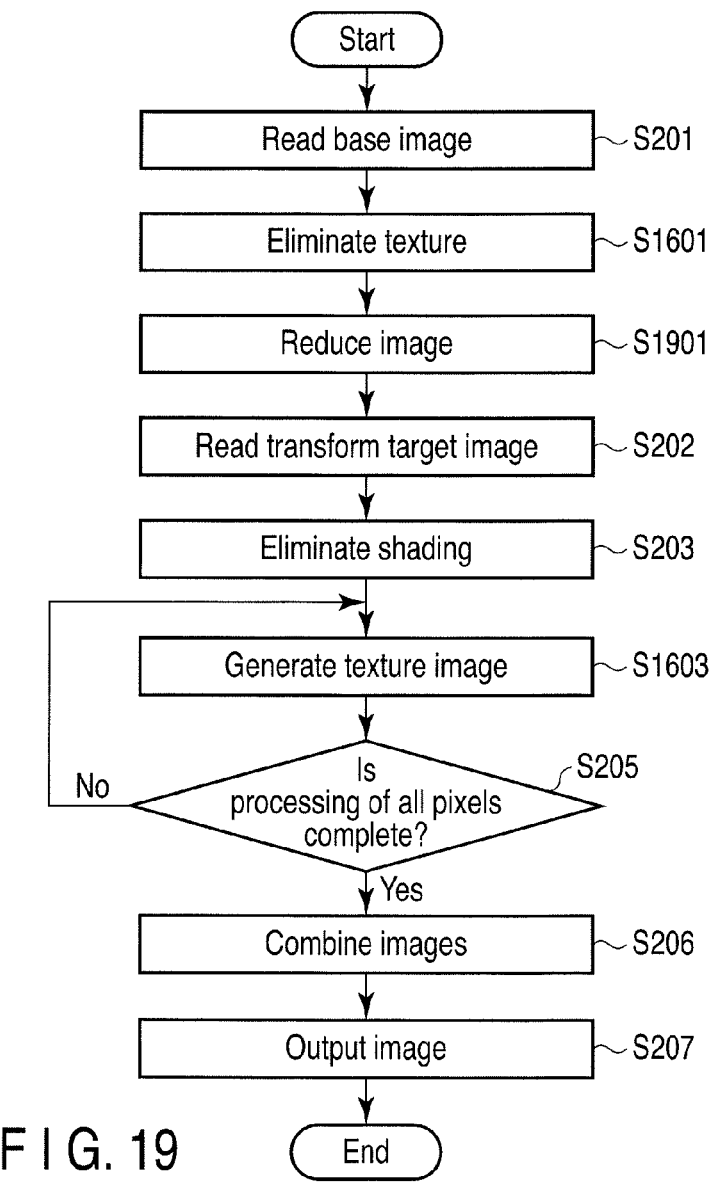
FIG. 19 is a flowchart exemplifying the operation of the image processing apparatus in FIG. 18.

An example of the operation of the image processing apparatus 18 will be described below with reference to FIG. 19.

The image reduction unit 1801 generates the sample skeleton image 1504 by performing reduction transformation of the base skeleton image 1502 generated in step S1601 (step S1901). Note that it is possible to execute the series of processing in steps S201, S1601, and S1901 and the series of processing in steps S202 and S203 in reverse order or in parallel.

As described above, the image processing apparatus according to the seventh embodiment generates a sample skeleton image by performing reduction transformation of a base skeleton image. Therefore, the image processing apparatus according to this embodiment need not generate a sample skeleton image based on a transform target image, and hence can select a texture component separation technique for the transform target image, with priority being given to an improvement in the accuracy of a sample texture image.

Eighth Embodiment

As shown in FIG. 20, an image processing apparatus 20 according to the eighth embodiment includes a sample texture image generation unit 1503, an image enlargement unit 2001, a texture image generation unit 1505, and an image combination unit 104. A base image 105 and a transform target image 106 are input to the image processing apparatus 20. The image processing apparatus 20 processes the transform target image 106 and outputs a combined image 110.

The sample texture image generation unit 1503 generates a sample texture image 107 and a sample skeleton image 1504 based on the transform target image 106. The sample texture image generation unit 1503 inputs a sample texture image 107 to the texture image generation unit 1505. The sample texture image generation unit 1503 inputs the sample skeleton image 1504 to the image enlargement unit 2001 and the texture image generation unit 1505.

The image enlargement unit 2001 generates a base skeleton image 1502 by performing enlargement transformation of the sample skeleton image 1504 from the sample texture image generation unit 1503. The base skeleton image 1502 has the same size as that of the base image 105 and combined image 110. The image enlargement unit 2001 inputs the base skeleton image 1502 to the sample texture image generation unit 1503. Note that the image enlargement unit 2001 may perform arbitrary enlargement transformation.

The texture image generation unit 1505 determines the identity of the object described above based on the base skeleton image 1502 from the image enlargement unit 2001 and the sample skeleton image 1504 from the sample texture image generation unit 1503.

An example of the operation of the image processing apparatus 20 will be described below with reference to FIG. 21.

The image enlargement unit 2001 generates the base skeleton image 1502 by performing enlargement transformation of the sample skeleton image 1504 generated in step S1602 (step S2101).

As described above, the image processing apparatus according to the eighth embodiment generates a base skeleton image by performing enlargement transformation of a sample skeleton image. Therefore, the image processing apparatus according to this embodiment applies texture component/non-texture component separation processing, which requires a relatively large amount of calculation, to a transform target image only once. That is, the image processing apparatus according to the embodiment can obtain a combined image in a short period of time (short delay).

Ninth Embodiment

Figure 22:
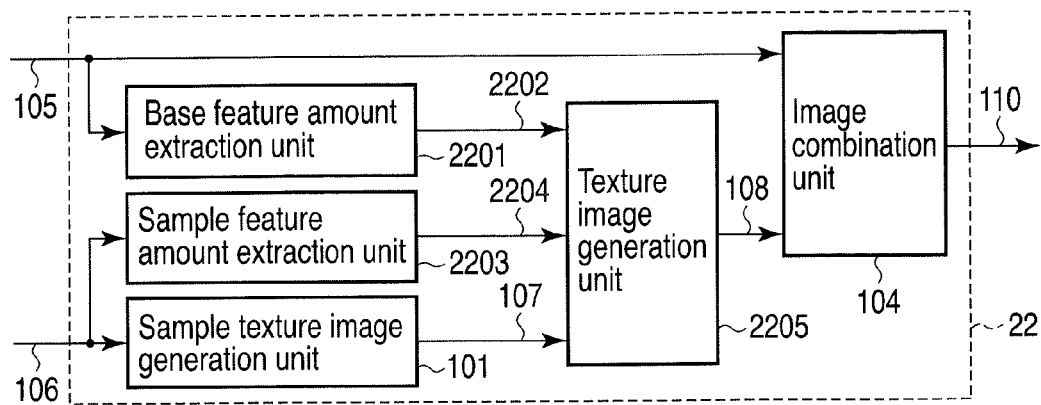
FIG. 22 is a block diagram exemplifying an image processing apparatus according to a ninth embodiment.

As shown in FIG. 22, an image processing apparatus 22 according to the ninth embodiment includes a base feature amount extraction unit 2201, a sample feature amount extraction unit 2203, a sample texture image generation unit 101, a texture image generation unit 2205, and an image combination unit 104. A base image 105 and a transform target image 106 are input to the image processing apparatus 22. The image processing apparatus 22 processes the transform target image 106 and outputs a combined image 110.

The base feature amount extraction unit 2201 obtains a base feature amount 2202 by extracting an image feature amount for each local area of the base image 105. The base feature amount 2202 reflects the pixel value feature of each local area of the base image 105. For example, the base feature amount 2202 may be the average or variance of the histogram of pixel values in each local area of the base image 105, a co-occurrence matrix feature characterizing a texture pattern in each local area, or the like. The base feature amount extraction unit 2201 inputs the base feature amount 2202 to the texture image generation unit 2205.

The sample feature amount extraction unit 2203 obtains a sample feature amount 2204 by extracting an image feature amount for each local area of the transform target image 106. The sample feature amount 2204 reflects the pixel value feature of each local area of the transform target image 106. Note that the sample feature amount 2204 and the base feature amount 2202 are the same type of image feature amounts. The sample feature amount extraction unit 2203 inputs the sample feature amount 2204 to the texture image generation unit 2205.

The texture image generation unit 2205 generates a texture image 108 based on a sample texture image 107 from the sample texture image generation unit 101. As will be described later, the texture image generation unit 2205 determines the identity of an object based on the base feature amount 2202 from the base feature amount extraction unit 2201 and the sample feature amount 2204 from the sample feature amount extraction unit 2203. The texture image generation unit 2205 generates the texture image 108 by using the determination result.

The image combination unit 104 generates the combined image 110 by combining the base image 105 with the texture image 108 from the texture image generation unit 2205.

Figure 23:
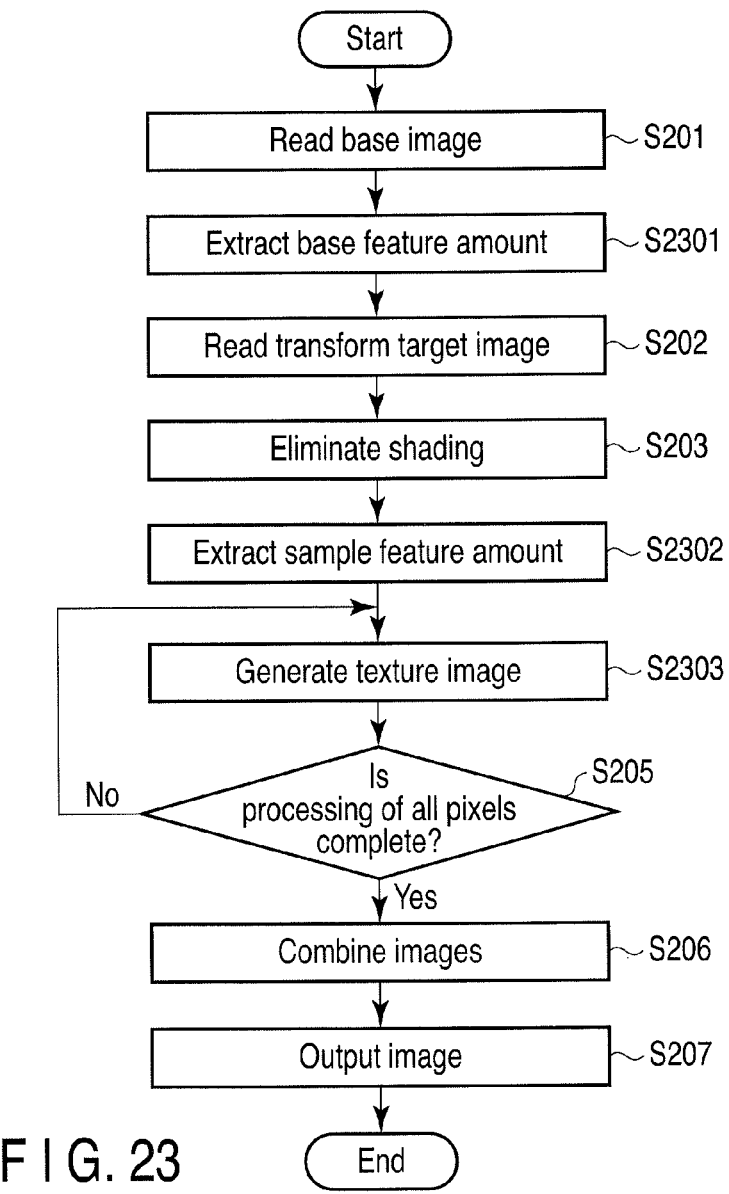
FIG. 23 is a flowchart exemplifying the operation of the image processing apparatus in FIG. 22.

An example of the operation of the image processing apparatus 22 will be described below with reference to FIG. 23.

The base feature amount extraction unit 2201 obtains the base feature amount 2202 by extracting an image feature amount from the base image 105 read in step S201 (step S2301). The sample feature amount extraction unit 2203 obtains the sample feature amount 2204 by extracting an image feature amount from the sample texture image 107 generated in step S203 (step S2302). Note that it is possible to execute the series of processing in steps S201 and S2301 and the series of processing in steps S202, S203, and S2302 in reverse order or in parallel.

The texture image generation unit 2205 generates each pixel constituting the texture image 108 based on the sample texture image 107 generated in step S203 (the loop of steps S2303 and S205).

The texture image generation unit 2205 differs from the texture image generation unit 1505 in that it determines the identity of an object based on the base feature amount 2202 and the sample feature amount 2204.

As shown in FIG. 24, the texture image generation unit 2205 determines the identity of an object with reference to a feature amount (to be referred to as a reference feature amount hereinafter) at a position corresponding to a processing target pixel in the base feature amount 2202.

For example, the texture image generation unit 2205 determines whether the similarity (e.g., the square difference between feature amounts or the absolute value of the difference between feature amounts) between each feature amount included in a neighboring area at a position corresponding to the processing target pixel in the sample feature amount 2204 and the reference feature amount is equal to or less than a threshold Th'. If the similarity between a given feature amount and the reference feature amount is equal to or less than the threshold Th', the texture image generation unit 2205 determines that the corresponding pixel in the texture image 108 expresses the same object as that expressed by the processing target pixel. If the similarity between a given feature amount and the reference feature amount exceeds the threshold Th', the texture image generation unit 2205 determines that the corresponding pixel in the texture image 108 does not express the same object as that expressed by the processing target pixel.

Since image feature amounts (the base feature amount 2202 and the sample feature amount 2204) each reflect the pixel value feature of each local area in the image, a large difference tends to occur between local areas expressing different objects.

The texture image generation unit 2205 narrows down the search range to pixels determined to express the same object as that expressed by the processing target pixel in the texture image 108. In other words, the texture image generation unit 2205 excludes pixels determined not to express the same object as that expressed by the processing target pixel in the texture image 108.

In addition, the identity determination result on an object (i.e., the similarity between an object expressed by a processing target pixel and an object expressed each pixel included in a neighboring area) can be expressed by a multilevel value (a real number between or equal to 0 and 1) instead of a binary value (0 or 1). When expressing the identity determination result on an object with a multilevel value, the texture image generation unit 2205 may search the search range for a pixel area in which the weighted sum of the SSD between itself and a template area and the total sum of identity determination results is minimum.

Alternatively, when expressing the identity determination result on an object with a multilevel value, the texture image generation unit 2205 may assign each pixel in the search range a weight corresponding to a determination result. That is, the texture image generation unit 2205 may search the search range for a pixel area in which the weighted sum of square differences between itself and a template area is minimum.

The image combination unit 104 generates the combined image 110 by combining the base image 105 read in step S201 with the texture image 108 generated in the loop of steps S2303 and S205 (step S206).

As described above, the image processing apparatus according to the ninth embodiment searches for a similar area by using the identity determination result on an object. The image processing apparatus according to this embodiment is robust against an error caused by the texture of a false object being assigned to a processing target pixel near an object boundary, and avoids texture failure of a combined image due to the propagation of such an error. That is, the image processing apparatus according to the embodiment can obtain a high-definition combined image which accurately retains the texture of a transform target image including a plurality of objects.

Each embodiment described above can be implemented by using a general-purpose computer as basic hardware. Programs implementing the processing in each embodiment described above may be provided by being stored in a computer-readable storage medium. The programs are stored, in the storage medium, as files in a form that can be installed or in a form that can be executed. The storage medium can take any form, for example, a magnetic disk, an optical disc (e.g., a CD-ROM, CD-R, or DVD), a magnetooptical disc (e.g., an MO), or a semiconductor memory, as long as it is a computer-readable storage medium. In addition, it is possible to store the programs implementing the processing in each embodiment described above in a computer (server) connected to a network such as the Internet and make a computer (client) download the programs via the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
a first generation unit configured to generate a sample texture image holding a texture component of a transform target image;
a second generation unit configured to generate a texture image by searching for a similar pixel area to a processed pixel area near a processing target pixel in the texture image larger than the sample texture image from a neighboring area at a position corresponding to the processing target pixel in the sample texture image and assigning the processing target pixel a pixel value near the similar pixel area in accordance with a positional relationship between the processed pixel area and the processing target pixel; and
a combination unit configured to generate a combined image by combining the texture image with a base image which holds a non-texture component of the transform target image and has same size as that of the texture image,
wherein the second generation unit searches for the similar pixel area based on a first similarity between a pixel value in a pixel area in the neighboring area and a pixel value in the processed pixel area and a determination result indicating whether each pixel in the neighboring area expresses a same object as that expressed by the processing target pixel.

2. The apparatus according to claim 1, wherein the second generation unit determines whether each pixel in the neighboring area expresses the same object as that expressed by the processing target pixel, by evaluating a second similarity between a reference pixel corresponding to the processing target pixel in a base skeleton image which is a non-texture component of the base image and has same size as that of the texture image and each pixel corresponding to the neighboring area in a sample skeleton image having the same size as that of the sample texture image.

3. The apparatus according to claim 2, wherein the second generation unit calculates, as the second similarity, a distance between a pixel value of the reference pixel and a pixel value of each pixel corresponding to the neighboring area in the sample skeleton image.

4. The apparatus according to claim 2, wherein the second generation unit excludes a pixel determined not to express the same object as that expressed by the processing target pixel from a search range for the similar pixel area.

5. The apparatus according to claim 2, wherein the second generation unit searches for the similar pixel area based on a weighted sum of the first similarity and the second similarity.

6. The apparatus according to claim 2, further comprising a third generation unit configured to generate the base skeleton image by separating a non-texture component from the base image.

7. The apparatus according to claim 2, wherein the first generation unit generates the sample texture image and the sample skeleton image by separating a texture component and a non-texture component from the transform target image.

8. The apparatus according to claim 2, further comprising a reduction unit configured to generate the sample skeleton image by performing reduction transformation of the base skeleton image.

9. The apparatus according to claim 2, further comprising an enlargement unit configured to generate the base skeleton image by performing enlargement transformation of the sample skeleton image.

10. The apparatus according to claim 1, wherein the second generation unit determines whether each pixel in the neighboring area expresses the same object as that expressed by the processing target pixel, by evaluating a second similarity between a reference feature amount, of an image feature amount of each local area in the base image, which corresponds to the processing target pixel and each feature amount, of a image feature amount of each local area in the sample texture image, which corresponds to the neighboring area.

* * * * *

UNITED STATES PATENT AND TRADEMARK OFFICE
CERTIFICATE OF CORRECTION

PATENT NO. : 8,144,996 B1
APPLICATION NO. : 13/051731
DATED : March 27, 2012
INVENTOR(S) : Saito et al.

It is certified that error appears in the above-identified patent and that said Letters Patent is hereby corrected as shown below:

Title Page, after Item (22), "Filed", and before Item (30), "Foreign Application Priority Data", insert the following missing data:

Item --(65)          Prior Publication Data
            US 2012/0057798 A1 Mar. 8, 2012--.

Signed and Sealed this
Third Day of July, 2012

David J. Kappos
*Director of the United States Patent and Trademark Office*